Patented Dec. 5, 1922.

1,437,783

UNITED STATES PATENT OFFICE.

EWALD STEINBUCH, FRANZ ACKERMANN, AND MAX UTZINGER, OF BASEL, SWITZERLAND, ASSIGNORS TO THE SOCIETY OF CHEMICAL INDUSTRY IN BASLE, OF BASEL, SWITZERLAND.

MANUFACTURE OF CONDENSATION PRODUCTS OF THE ANTHRAQUINONE SERIES.

No Drawing. Application filed May 23, 1922. Serial No. 563,171.

*To all whom it may concern:*

Be it known that we, EWALD STEINBUCH, FRANZ ACKERMANN, and MAX UTZINGER, all three citizens of the Swiss Republic, and residents of Basel, Switzerland, have invented new and useful Improvements in the Manufacture of Condensation Products of the Anthraquinone Series, of which the following is a full, clear, and exact specification.

It has been found that by treating amido-compounds of the anthraquinone series, the amino group of which may also be mono-substituted, with derivatives of 1.3.5-triazine halogenated in the nucleus, as for instance cyanuric chloride, valuable condensation products containing 1.3.5-triazine nuclei are obtained which may be used partly as colouring matters, partly as starting materials for the production of dyestuffs.

The condensation can advantageously be effected in such a manner that the respective anthraquinone and 1.3.5-triazine derivatives are left to react on each other for a sufficient length of time dissolved or suspended in suitable agents such as nitrobenzene, chlorobenzene, naphthalene, toluene, glacial acetic acid, and so on, whereby according to need lower or higher temperatures are employed; if desirable condensation agents are added, for instance cuprous chloride, or also other auxiliary substances, e. g., agents binding halogen acids. The solvent may also be omitted by simply melting together the respective compounds to which the aforementioned catalytic or other auxiliary substances have been added if necessary.

With 1.3.5-triazine derivatives, which contain more than one halogen atom, there can be brought to reaction, according to circumstances, all halogen atoms which are present, or only a part of same. It is also possible to couple side by side with such a triazine derivative different anthraquinone derivatives. Finally reactive halogen atoms still present in the triazine nuclei of the condensation products obtained can, if desired, be saponified or further brought to react with suitable substances, such, for instance, as ammonia, primary and secondary amines, and OH- or SH-groups containing compounds of the aliphatic or of the benzene-naphthalene-anthraquinone series, etc.

*Examples.*

1. 223 parts of 1-amido-anthraquinone and 185 parts cyanuric chloride are stirred into about 2500 parts of nitrobenzene, maintaining the temperature at about 130 degrees centigrade during half an hour, whereby gaseous hydrochloric acid is evolved. Gradually a yellow compound separates out, the quantity of which increases on the cooling of the reaction mass. Filtered from the nitrobenzene solution, washed with alcohol, and dried, it constitutes a yellow powder which is difficultly soluble in cold, more soluble in warm nitrobenzene, the solution being yellow to brown. The compound contains chlorine; a chemical analysis shewed a chlorine content up to 18.5%. Introduced into concentrated sulfuric acid it yields, according to the ratio of concentration, a yellow to brown solution from which gradually, quicker on heating, hydrochloric acid separates.

2. Mix together 223 parts of 1-amido-anthraquinone in nitrobenzene with 92.2 parts of cyanuric chloride and heat the mixture during half an hour to 190/195 degrees centigrade. The resulting product is a yellow compound which has similar solubility properties as the one obtained according to Example 1. An analysis of the product indicates a proportion of 6.39% of chlorine.

3. Mix a solution of 61.5 parts of cyanuric chloride in about 2000 parts of nitrobenzene with 223 parts of 1-amido-anthraquinone and some cuprous chloride. Heat the mixture while stirring to the boiling point of nitrobenzene and maintain it at this temperature for about 12 hours, that is to say, until the evolution of hydrochloric acid almost ceases and no chlorine, or only slight traces of the same, are present in the separating product. The condensation product is a dark yellow, microcrystalline powder, free, or almost free, of chlorine. It is almost insoluble in cold, somewhat more soluble in hot nitrobenzene, the solutions being yellow to brown. In concentrated sulfuric acid it forms a golden-yellow to brown solution from which, on dilution with water, it precipitates unchanged. From a hydrosulfite vat powerful yellow shades may be obtained with this coloring-matter on cotton as well as on wool. Similar colorations can also be obtained with the product obtained according to Examples 1 and 2.

4. 223 grams of 2-amido-anthraquinone are mixed with 92.5 grams of cyanuric chlorine in nitrobenzene and heated first for two hours to about 190 degrees centigrade, and afterwards during one hour to the boiling point of nitrobenzene. The resulting product constitutes a light yellow powder with 6.53% of chlorine.

5. 253 parts of 1-amido-4-methoxy-anthraquinone are heated with 61.5 parts of cyanuric chloride in nitrobenzene to about 100 degrees centigrade maintaining the mixture at this temperature, whilst stirring, during 10 hours. Then 200 parts of dehydrated sodium acetate are added and the mixture is maintained for a further hour at the above temperature. Then the temperature is raised to 115 to 120 degrees centigrade and the mixture still treated at the same temperature for a further period of about 30 hours. At the usual working up, a yellow-red product results, which is soluble in warm nitrobenzene and in sulfuric acid to yellow-red to red solutions. Dyeings on cotton gave red-orange to yellow-red shades.

6. 29 parts of 2-beta-naphthylamino-4.6-dichloro-1.3.5-triazine (Ber. 19, page 2056, Fries) and 45 parts of 1-amino-anthraquinone are heated during 20 hours in nitrotoluene to a temperature of about 218° C. The isolated product free of chlorine is a brownish powder giving, when dyed on cotton, reddish yellow shades. The same compound can further be obtained by condensing the product of Example 2 with beta-naphthylamine.

7. 53 parts of 2.4-diphenyl-6-chloro-1.3.5-triazine (Beilstein 3rd edition, vol. IV, page 1190) and 45 parts of 1-amino-anthraquinone are heated in nitrobenzene during 12 hours to about 218° C., whereby gaseous hydrochloric acid is evolved. The resulting product is a dark-orange colored compound free or almost free of chlorine.

8. 56 grams of the compound obtained according to Example 4 are stirred with 22.5 grams of 1-amino-anthraquinone in nitrotoluene during 20 hours, heating thereby to about 218° C. Resulting product: a dark yellow powder containing no chlorine or only traces of chlorine.

9. A suspension or solution, respectively, of the compound obtained according to Example 2 in nitrobenzene is heated to the boiling point of the latter. While stirring, pass during 3½ to 4 hours a current of ammonia gas through the mixture, whereby ammonium chloride is formed. The resulting product is a brownish compound free of chlorine. When dissolved in sulfuric acid no development of hydrochloric acid takes place, in contradistinction to the starting product (product of Example 2).

10. 55 grams of the condensation product obtained according to Example 4 are heated for 3-4 hours with 20 grams aniline in nitrobenzene to 180-185° C. At the working up a deep yellow compound free of chlorine is obtained, besides hydrochloride of aniline as by-product. It dyes cotton in more greenish-yellow shades than the product of Example 3.

11. 51 parts of 1-amino-4-methoxy-anthraquinone, 10 parts of aniline and 18.5 parts of cyanuric chloride are stirred for 10 hours in nitrobenzene at a temperature of about 100° C. Then 40 parts of dehydrated sodium acetate are added and the temperature of the mixture is raised, after a further hour, to 115-120° C. and maintained for further 24 hours. The resulting product constitutes a red powder furnishing on cotton scarlet-red shades.

12. 11.2 parts of the compound obtained according to Example 2 are heated in nitrobenzene and, after adding 1.4 parts of sodium ethylate, which produces a fairly energetic reaction, the temperature is maintained for 3 hours at 150-160° C. The resulting product forms a light brown powder containing no chlorine or only traces of chlorine.

13. A mixture of 11.2 parts of the product of Example 4 with 3.4 parts of thionaphthol in 160 parts of nitrobenzene is maintained for 4 hours at the boiling point. While hydrochloric acid is evolved, a light olive-colored compound is formed, which dyes cotton yellow.

14. 72 parts of 1.5-diamido-anthraquinone and 18 parts of cyanuric chloride are heated in nitrotoluene to 190-195° C. and maintained at this temperature for about one hour. Then the mixture is heated during 12 hours to boiling. There results thus a brown product free or almost free of chlorine, which dyes cotton in red-brown shades.

15. 24 parts of 1.5-diamido-anthraquinone, 37 parts of cyanuric chloride and some cuprous chloride are stirred during ¾ hour in nitrobenzene heated to the boiling point. The resulting product forms a reddish-yellow powder containing chlorine and dyeing cotton in reddish-yellow shades.

16. 47 parts of 1.4-diamino-anthraquinone and 18 parts of cyanuric chloride are heated in nitrobenzene for 12 hours to 118-125° C. After working up a product containing chlorine is obtained, which dyes cotton powerful violet shades.

17. By heating 24 parts of 1.4-diamino-anthraquinone for ¾ hour with 19 parts of cyanuric chloride and some cuprous chloride in boiling nitrobenzene there results a red condensation product dyeing cotton red.

In analogy to the anthraquinone derivatives hereinbefore mentioned other amido-compounds of the anthraquinone series react with 1.3.5-triazine derivatives halogenated in the nucleus, whereby again from the same starting materials various condensation products may be obtained quite according to the quantitative relations and the conditions of reaction; the following further derivatives may for instance be mentioned: 1-amino-4-chloro-anthraquinone, 1-amino-4-oxyanthraquinone, 1-amino-2-methyl-4-toluido-anthraquinone, 1-amino-4.5.8-trioxy-anthraquinone, 1.8-diamino-anthraquinone, 1.5-diamino-4.8-dioxy-anthraquinone, 4-amino-1.1'-dianthrimid. Also anthraquinone derivatives mono-substituted in the amino-group may be employed as, for instance, acetyl-benzoyl-amino-anthraquinones, methylamino-anthraquinone. The number of the condensation products, which can be prepared, is, as can be easily understood, so to speak, unlimited. Chlorinated triazine derivatives can, of course, also be replaced by such containing another halogen as, for instance, cyanuric bromide.

What we claim is:

1. A process for the manufacture of new condensation products of the anthraquinone series consisting in reacting on amido-compounds of the anthraquinone series with derivatives of 1.3.5-triazine halogenated in the nucleus.

2. A process for the manufacture of new condensation products of the anthraquinone series consisting in reacting on amido-compounds of the anthraquinone series, the amino-groups of which are monosubstituted, with derivatives of 1.3.5-triazine halogenated in the nucleus.

3. A process for the manufacture of new condensation products of the anthraquinone series consisting in reacting on amido-compounds of the anthraquinone series with derivatives of 1.3.5-triazine halogenated in the nucleus, and condensing the resulting reaction products with further compounds.

4. A process for the manufacture of new condensation products of the anthraquinone series consisting in reacting on amido-compounds of the anthraquinone series, the amino-groups of which are monosubstituted, with derivatives of 1.3.5-triazine halogenated in the nucleus, and condensing the resulting reaction products with further compounds.

5. As new substances the herein described compounds of the anthraquinone series which contain in their molecules 1.3.5-triazine nuclei, and constitute colored powders generally difficultly soluble in organic solvents, and forming with concentrated sulfuric acid colored solutions.

In witness whereof we have hereunto signed our names this 8th day of May 1922, in the presence of two subscribing witnesses.

EWALD STEINBUCH.
FRANZ ACKERMANN.
MAX UTZINGER.

Witnesses:
JULIA DURST,
AMAND RILLEY.